Patented Sept. 11, 1951

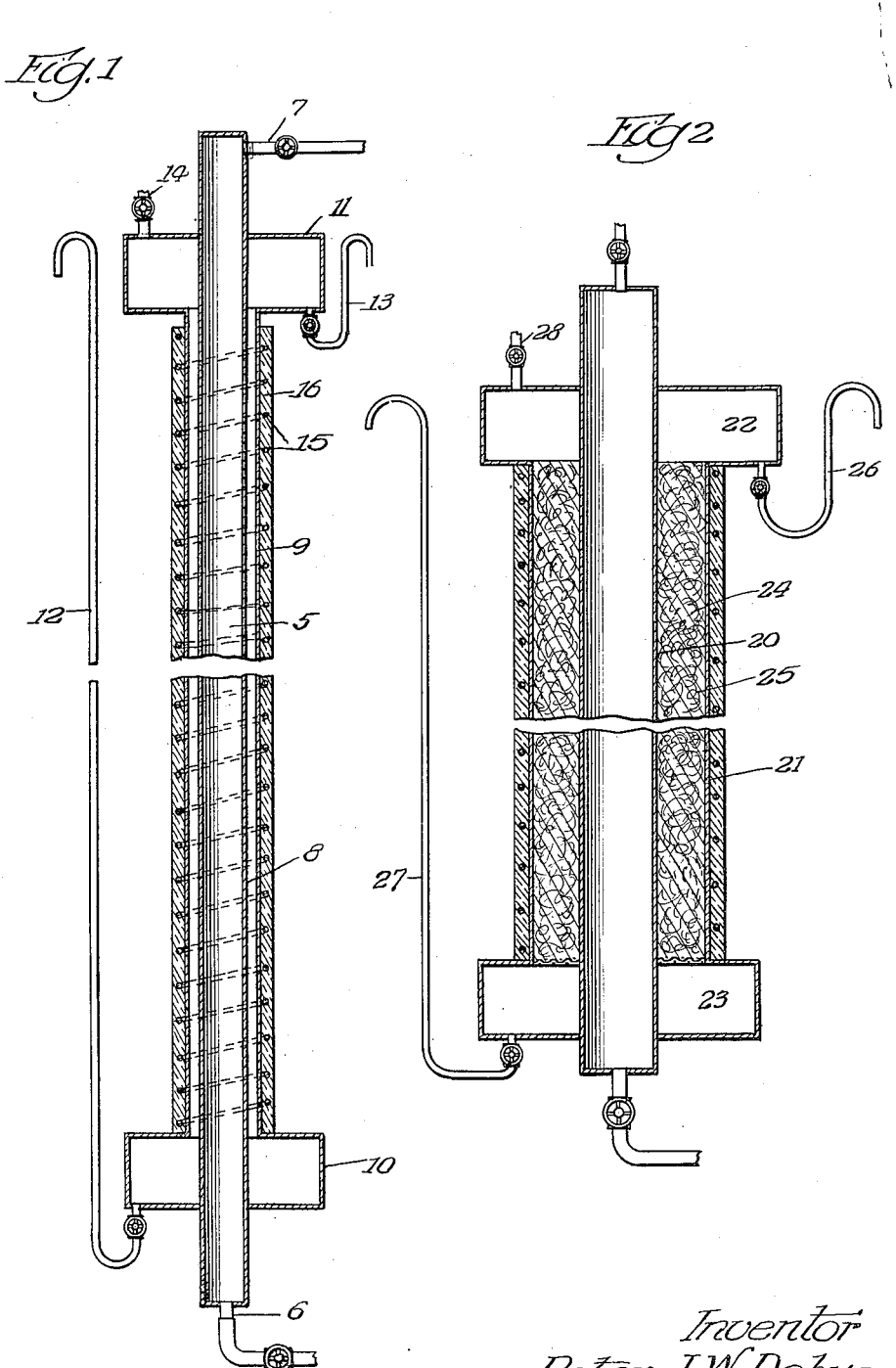

2,567,765

UNITED STATES PATENT OFFICE 2,567,765

METHOD OF AND APPARATUS FOR EFFECTING THERMAL DIFFUSION

Peter J. W. Debye, Ithaca, N. Y.

Application April 17, 1946, Serial No. 662,909

8 Claims. (Cl. 210—52.5)

The present invention relates to improvements in methods and apparatus for effecting thermal diffusion in solutions of organic substances of high molecular weight and may be employed not only for the laboratory demonstration of the principles of thermal diffusion, but also for effecting concentration of solutions of such substances of high molecular weight, and particularly of polymerizable substances, while operating under conditions tending to minimize further polymerization thereof.

In accordance with the present invention, it is possible to effect a concentration of dilute solutions of high molecular weight polymers or other high molecular weight compounds at relatively low temperatures, say at and below 100° C., thus avoiding the necessity for the use of higher temperatures such as would be required in evaporation processes at normal pressures and also avoiding the use of high vacua, such as would be required in evaporation processes conducted at low temperatures.

The invention will be fully understood from the following description thereof, illustrated by the accompanying drawings in which:

Figure 1 shows in section, partly broken away, a form of apparatus suitable for carrying the invention into effect, and Fig. 2 shows in section, partly broken away, a modified form of apparatus for carrying out the invention.

In accordance with the present invention it has been found that solutions of high molecular weight compounds and particularly of high molecular weight polymers are especially susceptible to concentration by the principles of thermal diffusion. In effecting such thermal diffusion for purposes of concentration, two surfaces are disposed vertically and separated by a space in which a body of the solution to be treated is maintained. One of these surfaces is maintained at a higher temperature than the other, so that a temperature gradient exists in the solution in the space between the two surfaces. The space communicates at the top and bottom with reservoirs holding substantial quantities of the liquid under treatment. In such apparatus, two major effects appear. One is convective, resulting in a tendency for liquid to ascend in the neighborhood of the warmer surface and to descend in the neighborhood of the colder surface. The other tendency in the case of high molecular weight solutes is for the solute particles to be driven toward the colder surface under the influence of the thermal gradient. As a result of both these tendencies, with high molecular weight substances, the concentration of the solute increases in the lower reservoir and decreases in the higher reservoir. I have found that these results, which are relatively insignificant or non-existent in solutions of low molecular weight substances, become pronounced when the solutes have molecular weights in the order of 15,000 to 30,000 and higher and are very considerable, for example, in substances having molecular weights of 2,000,000 to 5,000,000 or even higher.

The separation of the surfaces may be, say from ½ to 8 millimeters or even greater. With greater separations, say above 2 millimeters, I have found it to be advantageous to pack the space containing the solution under treatment with suitable inert or non-reactive material such as glass wool, slag wool, or the like, providing continuous voids of small size, say of an average diameter of 1 millimeter or less, whereby the vertical flow or convection movement of the solution may be retarded without materially decreasing the thermal diffusion effect.

An apparatus in convenient form suitable for carrying the invention into effect is illustrated in Fig. 1, in which the heated and cooled surfaces with which the solution of high molecular weight compounds is in contact are cylindrical in form, the space occupied by the solution being annular. As illustrated in the drawing, there is provided an inner hollow cylinder 5, which is cooled by any suitable cooling medium; for example, by water which is introduced at the lower end of the cylinder at 6 and discharged from suitable vent 7 at the upper end of the cylinder. The outer surface 8 of this cylinder provides the cooled surface in contact with the liquid to be treated.

The other surface is provided by the internal surface 9 of a hollow cylinder concentric to the cylinder 5, an annular space being thus provided between the surfaces 8 and 9. This space communicates at the bottom with the reservoir 10 and at the top with the reservoir 11. From the bottom of the reservoir 10 a vertical discharge tube or pipe 12 extends to a point above the level of liquid maintained in the reservoir 11. From the bottom of the reservoir 11 a similar but shorter vertical discharge tube or pipe 13 likewise extends to a point above the level of liquid maintained in the reservoir 11. The reservoir 11 is also provided with a vent or opening 14 through which the solution to be subjected to treatment may be introduced into the device and for other purposes as hereinafter brought out. Control valves may be provided in discharge pipes 12 and 13 as desired.

The outer cylindrical surface 9 is heated by any convenient means; for example, it may be heated electrically by a resistance coil 15, suitable insulation material 16 being provided around the cylinder 9 to facilitate the maintenance of the desired temperature.

The method of operation of the device is as follows:

The solution to be subjected to treatment is charged through the opening 14 into the system and fills the lower reservoir 10, the annular space between the surfaces 8 and 9 and the upper reservoir 11 to the desired level. By means of heating coil 15 and the cooling medium within the cylinder 5, a desired temperature gradient is established between the two surfaces in contact with the solution under treatment. As this is maintained, the concentration of solute in the upper reservoir decreases and that in the lower reservoir increases and the treatment may be continued until a desired difference in concentration is secured or until a stable condition is established. The solution of lower concentration may then be forced out of the reservoir 11 through the pipe 13, for example, by forcing air into the reservoir 11 through the opening 14. In a similar manner, the solution of higher concentration may be removed from the reservoir 10 through the pipe 12.

The distance between the two surfaces 8 and 9 with which the liquid is in contact is preferably in the order of ½ to 2 mm. when the space is unobstructed, as illustrated in Fig. 1. The height of the annulus or column of liquid between the heated and cooled surfaces may, in practical operation, vary from 10 cm. upwardly, being in some measure dependent upon the distance between the plates or surfaces, a preferred range for the height of the column of liquid being in the order of 15 to 120 cm. The shorter lengths of the annulus or column of liquid is used with the lesser thicknesses of the liquid column or the closer spacing of the heated and cooled surfaces between which the liquid is maintained. It is found that there are certain maximum heights of the liquid annulus beyond which no appreciable gain in effectiveness of the device is secured, these being greater with the greater spacing between the heated and cooled surfaces.

The temperature differential between the heated and cooled surfaces 9 and 8 respectively may vary and is dependent in part upon the spacing between these surfaces so as to provide a desired temperature gradient within the solution between the surfaces, which gradient may be conveniently expressed in degrees per centimeter thickness of the layer of liquid between the two surfaces. Thus it has been found convenient in operation with solutions of high molecular weight compounds or polymers as hereinafter described, with a 1 mm. spacing between surfaces, to maintain a temperature difference in the order of 50° C., which may be expressed as a temperature gradient of 500° C. per cm. As will be apparent, when the spacing between the surfaces is ½ mm., the same temperature gradient will be secured with a temperature difference between the plates of 25° C.

The instrument may be used, for example, for effecting concentration of organic polymers of high molecular weight in the order of 15,000 or higher and will effect a substantial concentration of the solute in the solvent under conditions involving relatively low temperatures of operation. Thus with the cold surface maintained at a temperature in the order of 10° C. and with a spacing between the cold and the hot surfaces of 1 mm., the temperature of the heated surface may be in the order of 60° to 75° C. to maintain temperature gradients of from 500° to 650° C. per centimeter. Temperature gradients as high as 960° to 1000° C. per centimeter may be employed.

The following example is illustrative:

An instrument in which the height of the annular column of liquid between the two reservoirs 10 and 11 was 40 cm., the spacing between the hot and cold surfaces was 1 mm., and the capacity of the reservoirs 10 and 11 was in the order of 50 to 70 cc. each, was charged with a solution of polystyrene in xylene, the polystyrene having a molecular weight of 240,000. The solution used contained 0.35% of the solute. The temperature differential between the hot and the cold surfaces was 50° C. At the end of four hours, the concentration of the solution in the upper reservoir 11 was found to be 0.27% and that in the lower reservoir 10 was found to be 0.42%; that is, the ratio of concentration of the solution in the upper reservoir to that of the lower reservoir was approximately 0.665.

With a similar instrument, but with the height of the liquid column between the heated and cold surfaces reduced to 20 cm., a lesser degree of concentration was secured, the temperature gradient being the same. The ratio of the concentration of solute in the upper reservoir to that in the lower reservoir for the same initial solution reached 0.88. With the separation of the heated and cooled surfaces reduced to 0.5 mm. and with the same temperature difference between these surfaces, it was found that much higher concentration could be secured with a shorter column of liquid between the surfaces. In this case, with the column of liquid with a height of 15 cc., after approximately 8 hours, the ratio of the concentration of the solute in the solution in the upper reservoir to that of the solution in the lower reservoir was 0.39.

It was found that with increasing molecular weight of the solute, a greater concentration thereof in the lower reservoir is secured under conditions otherwise the same. This feature is of great value in the handling and concentration of the more highly advanced polymers. Thus with the instrument first above referred to, in which the height of the liquid column between the heated and cooled surfaces was 40 cm. and the spacing between the heated and cooled surfaces 1 mm., the ratios of the final concentration of the solution in the upper reservoir to that of the solution in the lower reservoir were as follows for solutions in xylene of polystyrenes of different molecular weights:

Polystyrene of 20,000 molecular weight ____ 0.78
Polystyrene of 240,000 molecular weight ___ 0.65
Polystyrene of 5,000,000 molecular weight __ 0.25

Rubber-like olefin polymers derived from lower olefins and known commercially under the name "Vistanex" were similarly treated in the same instrument and for this material also a substantial change in concentration resulted as shown by a materially decreased viscosity of the solution in the upper reservoir and an increased viscosity of that in the lower reservoir. Similar results were secured with a solution of cellulose acetate in acetophenone.

Solutions of polystyrenes of different molecular weights were dissolved in toluene, sufficient solute being employed in each case so that the viscosities of the solution were about twice that of the solvent. In the instrument used, the spacing between the heated and cooled surfaces was ½ mm., the height of the column of liquid between the surfaces was 15 cm. and the temperature gradient was about 960° C. per cm. The solutions were permitted to stand until substantially no further change was apparent in the concentrations of the solutions in the upper and lower reservoirs. With a solution of polystyrene having a molecular weight of 28,000, the ratio of the concentration of solute in the upper reservoir to that of the solute in the lower reservoir, or the concentration quotient, was 0.70. In the case of the solution of polystyrene with a molecular weight of 240,000, the concentration quotient reached 0.59, and in the case of the solution of polystyrene having a molecular weight of 5,000,000, it reached 0.37. In these experiments the highest temperature to which the polymer was subjected at the heated surface was 75° C. In a similar experiment in the same apparatus, using a toluene solution of the polymer of 5,000,000 molecular weight and in which the highest temperature to which the polymer was subjected was 42° C., the temperature gradient being 320° C. per cm., a longer time was required to reach a stable condition, and at this point the concentration quotient was found to be 0.22.

It is a particular advantage of the present process that concentration of the high polymers may be effected without the use of excessively high temperatures, thus minimizing the changes which take place in the solution or in the extent of polymerization during concentration.

As is recognized, in many cases in solutions of polymers and other high molecular weight compounds having molecular weights of 15,000 to 20,000 or higher, the solute has a range of molecular weights, which may be wide or narrow, depending upon the conditions under which the the polymer and its solution are produced and maintained. In the use of the present invention upon such solutions it is found that molecular fractionation occurs, as evidenced, for example, by the absorption curves of the original and final solutions, determined spectrophotometrically as by a Beckmann quartz spectrophotometer, for example. This with solutions of polystyrene of various average molecular weights from about 28,000 to 5,000,000, in which the solute included a range of molecular weights, after the application of the thermal diffusion process, the absorption curves showed the presence of a larger proportion of lower molecular weight constituents in the solute in the solution in the top reservoir than in the solute in the original solution, and the reverse in the solute in the solution in the bottom reservoir. Since there is an increase in total concentration of the solute in the solution in the lower reservoir, the deviation of its absorption curve from that of the original will be less than that shown by the solution in the upper reservoir.

In carrying out the process of the present invention, any suitable low viscosity organic liquid may be employed as the solvent, depending upon the high molecular weight organic compound used. In other words, the organic liquid employed must be capable of dissolving the high molecular weight material, and should not be itself susceptible to change by polymerization or reaction with the polymer. For example, 2-heptanone, acetophenone, or other ketone having solvent properties may be used, as may the alcohols, aldehydes, aromatic and aliphatic hydrocarbons, etc. Such solvents are hereinafter collectively designated as inert organic solvents.

In Fig. 2 a modified form of device is shown, which may be employed in carrying out the present process. The form of device illustrated in Fig. 1 presents difficulties in mechanical construction because of the close spacing between the heated and cooled cylindrical surfaces and the mechanical difficulties in maintaining their uniform spacing or concentricity. It has been found that a greater spacing, say of 2 to 8 mm. between the heated and cooled surfaces may be employed successfully in accordance with the present process by packing the intervening space containing the solution to be treated with a suitable inert packing material of a porous or fibrous character such as to provide small continuous voids, such as fiber glass, glass wool, slag wool, or the like. The packing has the effect of slowing down the vertical or convection flow of the solution but does not appreciably effect the thermal diffusion of the polymer molecules toward the cooled surface.

Thus in Fig. 2, the inner cooled cylinder is designated by the numeral 20. Surrounding this is the outer heated cylinder 21. The space between the cylinders opens into the upper reservoir 22 and into the lower reservoir 23. The space 24 between the walls of these cylinders and between the reservoirs is packed with glass wool or other similar fibrous or inert material providing small continuous voids. The upper and lower reservoirs are provided with discharge tubes or pipes 26 and 27 respectively, as in the form of the device shown in Fig. 1. Similarly a vent or opening 28 is provided in the top of the upper reservoir for filling the device and for introducing air to effect the discharge of the liquids from the reservoirs after treatment.

With a device of this character the spacing between the heated and cooled surfaces may be increased considerably, say from 2 to 8 mm., and effective results secured. At the same time, the height of the column of liquid between the heated and cooled surfaces may be decreased. Thus with an instrument as illustrated in Fig. 2, the height of the column of liquid equal to 10 cm. and the separation between the heated and cooled surfaces equal to 4 mm., on treatment of a toluene solution of polystyrene having a molecular weight of 240,000, a substantial increase in concentration and viscosity of the solution in the lower reservoir and decrease in concentration and viscosity of that in the upper reservoir was accomplished in 8 to 10 hours.

I claim:

1. The method of concentrating solutions of organic compounds having molecular weights of at least 15,000 to 20,000 which comprises maintaining a vertical column of such solution in liquid state between spaced surfaces, the separation of said surfaces being from ½ to 8 mm., the height of said column being greater than the distance of separation of said surfaces, said column communicating with reservoirs at its top and bottom, and maintaining said surfaces at different temperatures whereby a temperature gradient is established in said column of solution transversely thereof and the solute concentration of the solution in the bottom reservoir is increased and that of the solution in the top reservoir is decreased.

2. The method of concentrating solutions of organic polymers having a molecular weight of at least 15,000 to 20,000 which comprises maintaining a vertical column of such solution of polymers in liquid state between spaced surfaces, the separation of such surfaces being from ½ to 8 mm., the height of said column being greater than the distance of separation of said surfaces, said column communicating with reservoirs at its top and bottom, and maintaining said surfaces at different temperatures whereby a temperature gradient is established in said column of solution transversely thereof and the polymer concentration of the solution in the bottom reservoir is increased and that of the solution in the top reservoir is decreased.

3. The method of concentrating solutions of organic polymers having a molecular weight of at least 15,000 to 20,000 which comprises maintaining a vertical column of such solution of polymers in liquid state between spaced surfaces, the separation of such surfaces being from ½ to 8 mm., the height of said column being greater than the distance of separation of said surfaces, said column communicating with reservoirs at its top and bottom, maintaining said surfaces at different temperatures, the highest of said temperatures being no over 100° C., whereby a temperature gradient is established in said column of solution transversely thereof and the solute concentration of the solution in the bottom reservoir is increased and that of the solution in the top reservoir is decreased.

4. The method of concentrating solutions of polystyrene in inert organic solvents, the said polystyrene having a molecular weight of at least 20,000, which comprises maintaining a vertical column of such polystyrene solution in liquid state between spaced surfaces, the separation of said surfaces being from ½ to 8 mm., the height of said column being greater than the distance of separation of said surfaces, said column communicating with reservoirs at its top and bottom, and maintaining said surfaces at different temperatures to establish a temperature gradient in the column of liquid therebetween of from 500 to 1,000° C. per cm., the highest of said temperatures being not over 100° C., whereby the concentration of polystyrene in the solution in the bottom reservoir is increased and that of the solution in the top reservoir is decreased.

5. The method of concentrating solutions of polystyrene in inert organic solvents, the said ploystyrene having a molecular weight of at least 2,000,000 to 5,000,000, which comprises maintaining a vertical column of such polystyrene solution in liquid state between spaced surfaces, the separation of said surfaces being from ½ to 8 mm. and the height of said column being greater than the distance of separation of said surfaces, said column communicating with reservoirs at its top and bottom, and maintaining said surfaces of different temperatures to establish a temperature gradient in the column of liquid therebetween of from 500 to 1,000° C. per cm., the highest of said temperatures being not over 100° C., whereby the concentration of polystyrene in the solution in the bottom reservoir is increased and that in the solution in the top reservoir is decreased.

6. The method of concentrating solutions of cellulose acetate in an inert organic solvent which comprises maintaining a vertical column of such cellulose acetate solution in liquid state between spaced surfaces, the separation of said surfaces being from ½ to 8 mm. and the height of said column being greater than the distance of separation of said surfaces, said column communicating with reservoirs at its top and bottom, maintaining said surfaces at different temperatures whereby a temperature gradient is established therebetween of from 500° to 1000° C. per cm., and the concentration of cellulose acetate in the solution in the bottom reservoir is increased and that in the solution in the top reservoir is decreased.

7. The method of concentrating solutions of high molecular olefinic polymers of molecular weight in excess of 15,000 to 20,000 in inert organic solvents which comprises maintaining a vertical column of such solution in liquid state between spaced surfaces, the separation of said surfaces being from ½ to 8 mm. and the height of said column being greater than the distance of separation of said surfaces, said column communicating with reservoirs at its top and bottom, maintaining said surfaces at different temperatures whereby a temperature gradient is established therebetween of from 500° to 1000° C. per cm., and the solute concentration of the solution in the bottom reservoir is increased and that in the solution in the top reservoir is decreased.

8. In apparatus for effecting concentration of solutions by thermal diffusion, an inner vertical cylinder, an outer vertical cylinder concentric with said inner cylinder and extending for a portion of the length thereof to provide a vertical annular space, the width of said annular space being less than its height and being from 2 to 8 mm., reservoirs being formed above and below said annular space and communicating therewith, inert packing material in said annular space, said packing material providing continuous voids of small size throughout said annular space, whereby a continuous body of liquid may be maintained in the said annular space and said upper and lower reservoirs, and means for cooling one of said cylindrical surfaces and for heating the other to maintain a temperature gradient in the liquid therebetween.

PETER J. W. DEBYE.

REFERENCES CITED

The following references are of record in the file of this patent:

UNITED STATES PATENTS

| Number | Name | Date |
|---|---|---|
| 2,158,238 | Hvid | May 16, 1939 |
| 2,258,594 | Brewer et al. | Oct. 14, 1941 |
| 2,363,009 | Lewis | Nov. 21, 1944 |
| 2,390,115 | McNitt | Dec. 4, 1945 |
| 2,411,238 | Zender | Nov. 19, 1946 |

OTHER REFERENCES

Berichte, vol. 73, pages 249–269.